Figure 1:
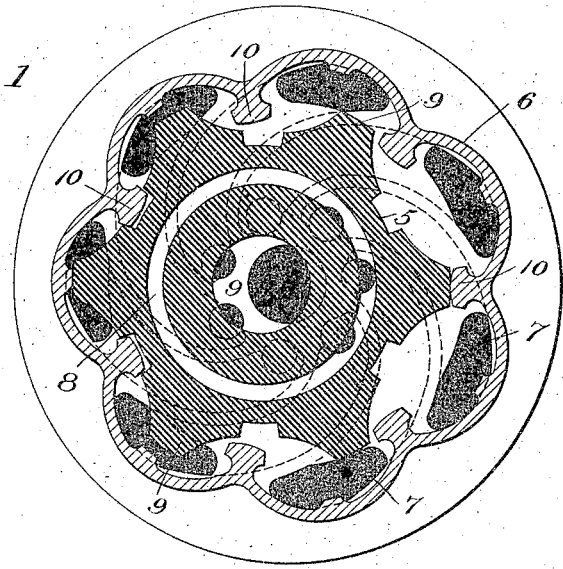

(No Model.)

L. H. NASH.
WATER METER.

No. 547,180.

5 Sheets—Sheet 1.

Patented Oct. 1, 1895.

WITNESSES:
Edwin L. Bradford
M. D. Blondel

INVENTOR
Lewis Hallock Nash
BY Johnson & Johnson
ATTORNEYS.

(No Model.)

L. H. NASH.
WATER METER.

No. 547,180. 5 Sheets—Sheet 2. Patented Oct. 1, 1895.

WITNESSES:
Edwin L. Bradford
M. D. Blondel

INVENTOR
Lewis Hallock Nash
BY
Johnson & Johnson
ATTORNEYS.

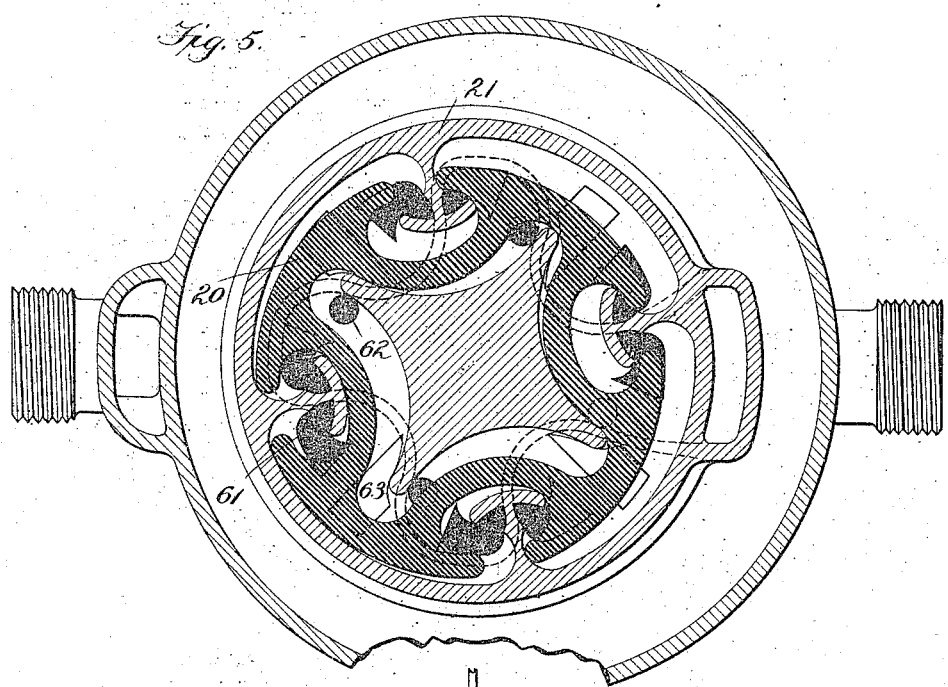
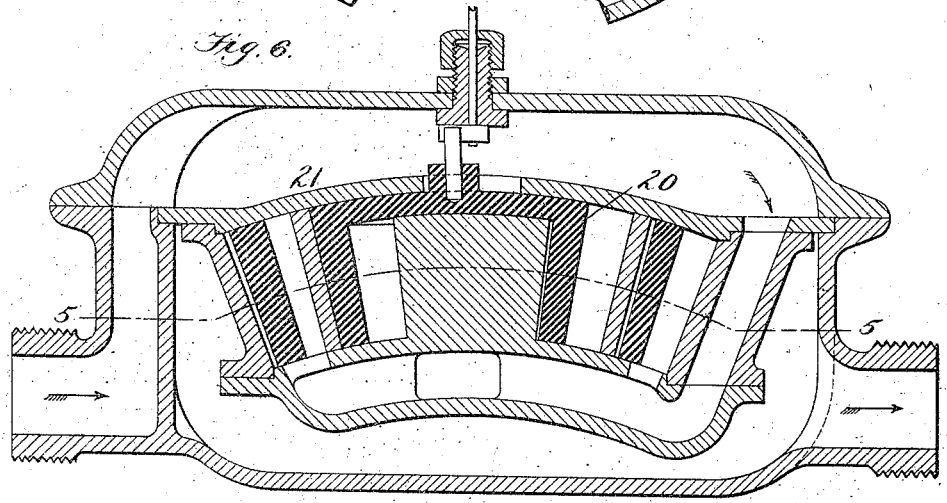

(No Model.) 5 Sheets—Sheet 4.

L. H. NASH.
WATER METER.

No. 547,180. Patented Oct. 1, 1895.

WITNESSES:
Edwin L. Bradford
M. D. Blondel

INVENTOR
Lewis Hallock Nash
BY Johnson & Johnson
ATTORNEYS (No Model.)

L. H. NASH.
WATER METER.

No. 547,180.

5 Sheets—Sheet 5.

Patented Oct. 1, 1895.

UNITED STATES PATENT OFFICE.

LEWIS HALLOCK NASH, OF SOUTH NORWALK, CONNECTICUT.

WATER-METER.

SPECIFICATION forming part of Letters Patent No. 547,180, dated October 1, 1895.

Application filed November 10, 1894. Serial No. 528,384. (No model.)

*To all whom it may concern:*

Be it known that I, LEWIS HALLOCK NASH, a citizen of the United States, and a resident of South Norwalk, in the county of Fairfield and State of Connecticut, have invented certain new and useful Improvements in Water-Meters, of which the following is a specification.

My present invention consists, in general terms, in combining with the piston of a water-meter having an orbit motion a chamber having spherical ends arranged so that gravity tends to drive the piston either away from or toward the center of the chamber, depending upon the curvature of such end walls. Water-meters having pistons operating with an orbit motion alone, or with other motion or motions, are now well known in this art. For example, in a patent granted to me January 21, 1879, No. 211,582, as well as in subsequent patents, I have shown and described a water-meter the piston of which has an orbit motion, together with a motion of rotation around its axis. Again, in a patent granted to me July 29, 1890, No. 433,088, and in other patents, I have shown and described a meter the piston of which has an orbit motion, but no motion of rotation around its axis. Again, in a patent granted to me June 17, 1884, No. 300,629, and in other patents, I have shown and described another meter the piston of which has an orbit motion and an oscillating motion about its axis. Again, in a patent granted to me April 7, 1891, No. 449,821, I have shown and described another meter the piston of which has an orbit motion, in some forms with a motion of rotation around its axis and in other forms without such rotation. These are some of the many meters which might be mentioned characterized by having a piston moving in an orbit within a measuring-chamber; but further enumeration is regarded as unnecessary here. My present invention is applicable to all forms of meters characterized by such orbit motion of the piston, irrespective of the fact whether other motions are or are not present, and irrespective of the character of the other motions present and of the details of construction of the devices.

I will describe my invention applied to three different forms of meters having pistons moving with an orbit motion as examples of the applicability of my invention to radically different structures.

Figure 2:
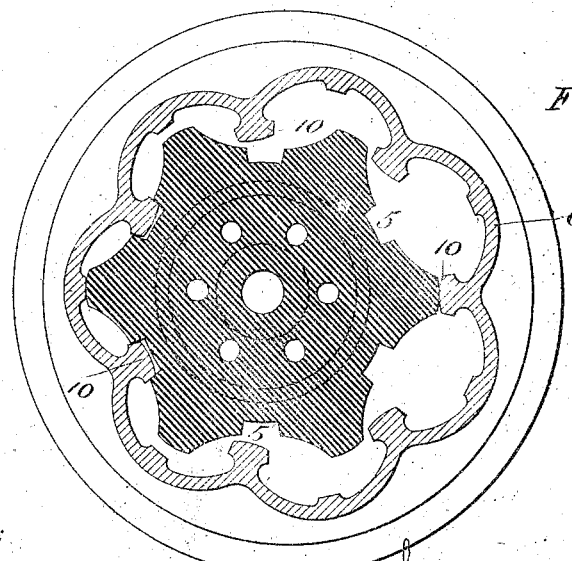
Figure 3:
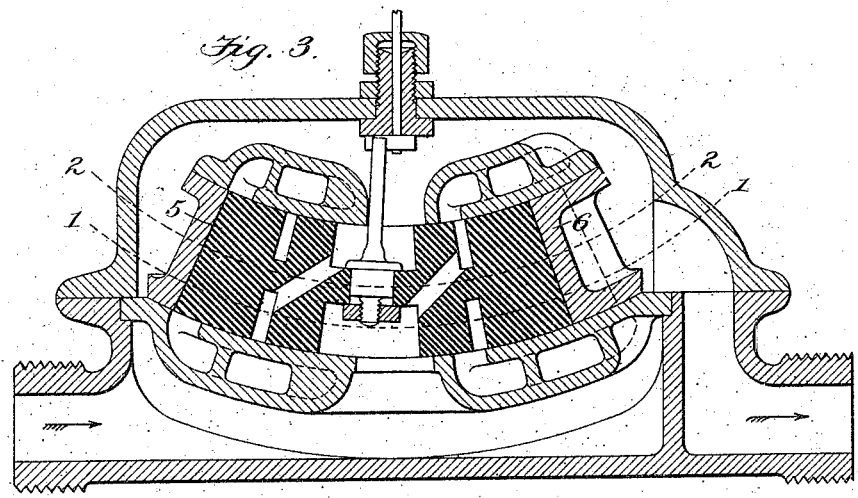
Figure 4:
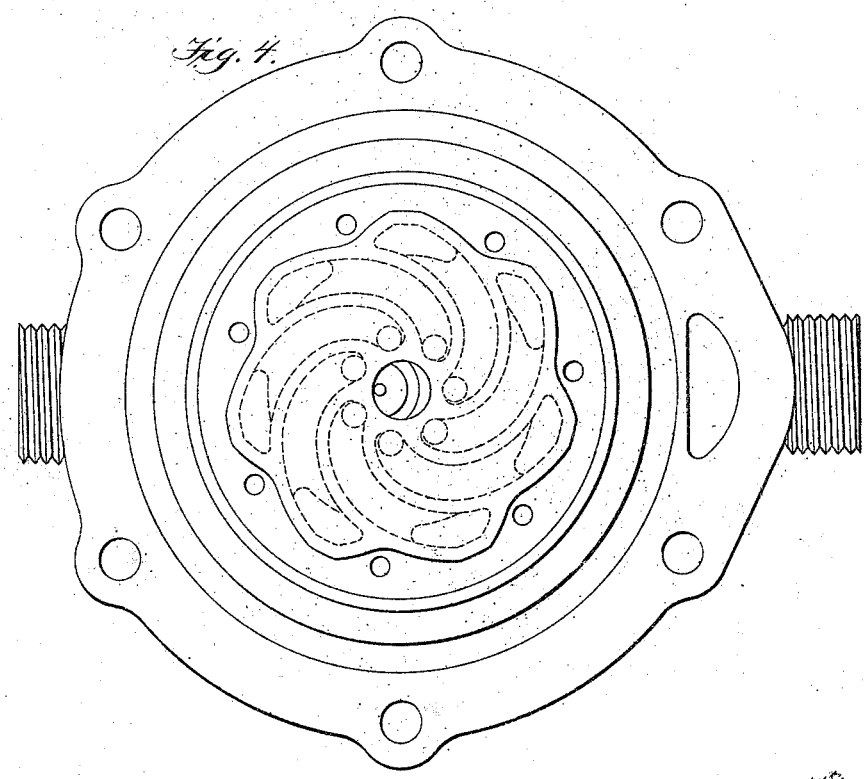
Figure 7:
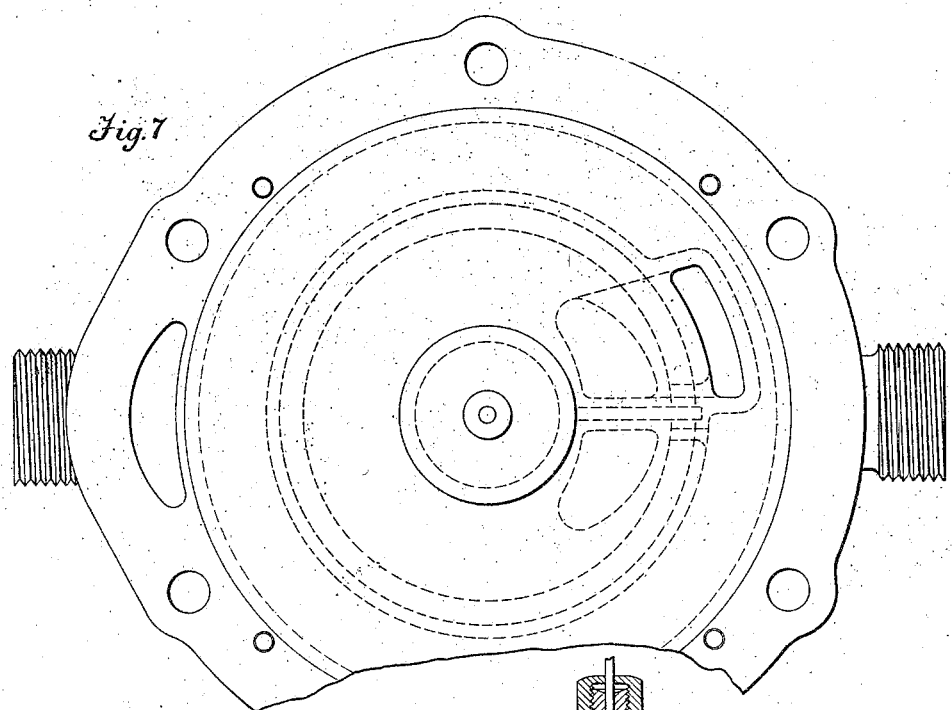
Figure 8:
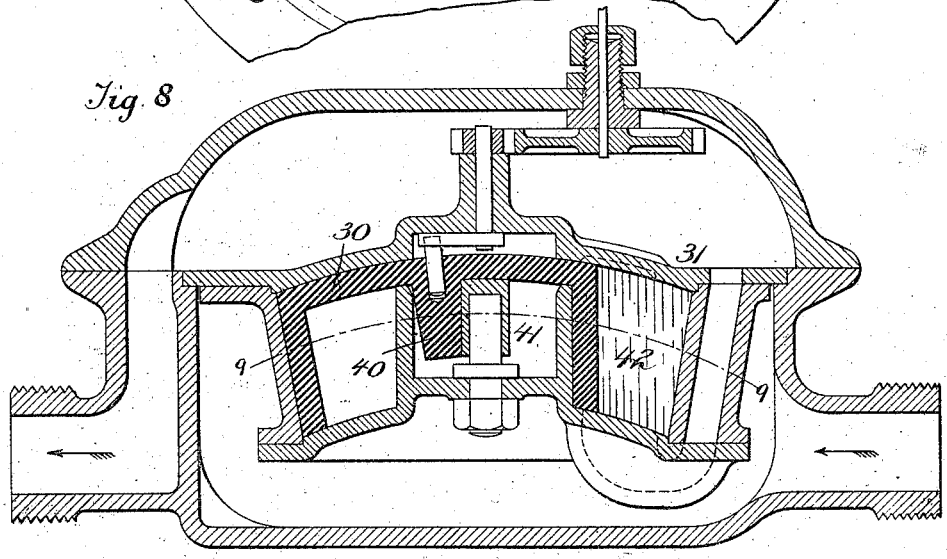
Figure 9:
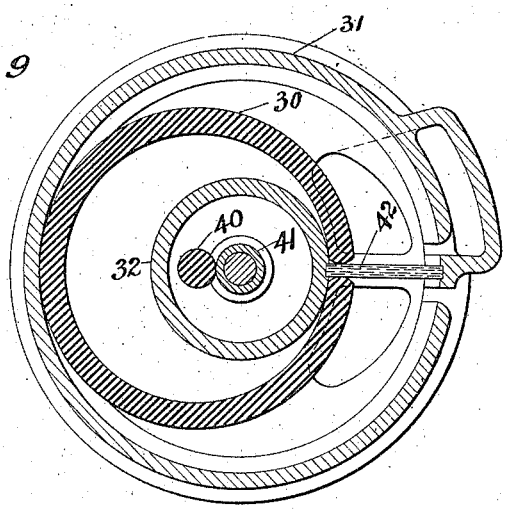
Figure 10:
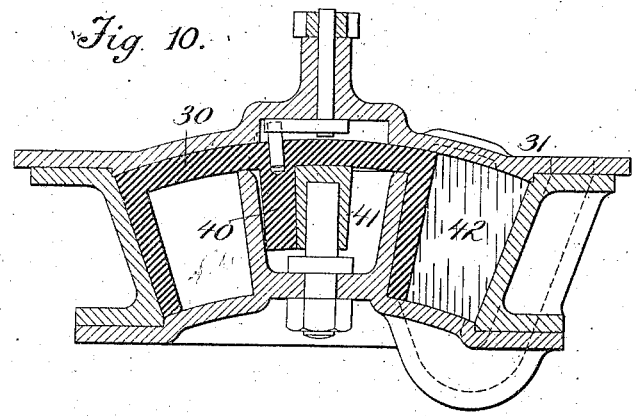

Figure 1 is a horizontal section through one form of meter on the line 1 1, Fig. 3. Fig. 2 is a section through the same meter on the line 2 2, Fig. 3. Fig. 3 is a vertical section, and Fig. 4 a top view, of the same meter, the cap being removed. Fig. 5 is a horizontal section through another form of meter on the line 5 5, Fig. 6, and Fig. 6 is a vertical section through the same. Fig. 7 is a top view of another form of meter, (that shown in Fig. 8,) the cap being removed. Fig 8 is a vertical section through the same. Fig. 9 is a horizontal section through the same on the line 9 9, Fig. 8; and Fig. 10 is a vertical section through the meter-chamber and the piston removed from the external case.

Referring to Fig. 1, 5 is the piston and 6 the measuring-chamber. 7 7 are the passages leading from the valve to the cylinder-chambers, through which water is admitted and discharged. These passages are curved and at their inner ends are controlled by ports 8 and 9 of the piston. The piston and the chamber are provided with points, the points on the piston being less in number than the points on the chamber. This piston, therefore, has a motion of rotation around its axis. As it always stands eccentrically with reference to its chamber and moves about constantly, maintaining this eccentric relation, it has what I term an "orbit motion." A farther description of this style of meter, which is known to the trade as the "Crown" and is described in patents previously granted to me, among others, No. 211,582, dated January 21, 1879, and No. 211,769, dated January 28, 1879, is considered unnecessary here.

Referring to Fig. 3 it will be observed that the upper and lower heads of the measuring-chamber are spherical in contour and that the piston is correspondingly shaped. As the piston is never concentric with its case, gravity constantly tends to shift the piston to a concentric position, and in doing so presses the points of the piston against the case-points 10 in contact therewith (see Fig. 1) and preserves or aids in preserving the joint-forming contact at these points where leakage in this form of meter is most liable to occur.

Referring to Fig. 5 it will be seen that there is here represented a piston provided with points and a measuring-chamber provided with points; but in this instance the points on the case and piston are of equal number, and hence the piston, while it has an orbit motion, does not rotate around its own axis. 20 is the piston and 21 the chamber. 61, 62, and 63 are the ports. As in the other case, the piston is its own valve, admitting the water to and from the measuring-spaces. A further description of the structure and mode of operation of this device is deemed unnecessary here, in view of the fact that meters constructed on this general plan are known to the art as the "Hersey" and are described in patents already issued—as, for example, my Patent No. 433,088.

Referring to Fig. 6 it will be observed that in this case the chamber end walls are also spherical, but the curvature is in the opposite direction to that of the walls of the chamber shown in Fig. 3, so that here gravity constantly tends to cause the center of the piston to recede from the center of the case, or, in other words, to increase the eccentricity of the piston's position. Thus gravity preserves or tends to preserve the joint-forming contact of the piston, as will be seen by reference to Fig. 5.

Referring to Fig. 9 there is shown a piston 30 of circular form, a case 31, an abutment 32, and a radial abutment 42. The piston is slit to straddle this abutment and is provided with a stud 40, working in connection with a roller 41, attached to the case. The piston in this case also has an orbit motion, while it has an oscillating motion about its axis in addition thereto. A further description of this form of meter is deemed unnecessary here, in view of the fact that it is well known to the trade as the "Gem," and is described in patents already issued, among others my Patent No. 300,629.

Referring to Fig. 8 it will be seen that the ends of the chamber are curved, so that gravity constantly exerts a force tending to press the piston in joint-forming contact with its case.

The feature in common to all the forms described is the orbit motion of the pistons and the spherical ends of the measuring-chambers. I might describe still other forms of meters involving the same principle, as it is applicable to many forms; but those already described are deemed to be sufficient to inform those skilled in the art of the nature of my invention and to instruct them how it may be applied.

What I claim, and desire to secure by Letters Patent, is—

1. In a water meter, the combination with a chamber having spherical end-walls of a piston having spherical ends operating therein with an orbit motion.

2. In a water meter, the combination of a chamber having spherical end-walls of a piston having spherical ends operating therein with an orbit motion and having also a motion of rotation around its axis.

LEWIS HALLOCK NASH.

Witnesses:
M. WILSON,
HARRY LYDECKER